United States Patent
Epps

(10) Patent No.: US 8,860,729 B2
(45) Date of Patent: Oct. 14, 2014

(54) GAZE INTENT ESTIMATION FOR RETARGETING OF CHARACTERS

(75) Inventor: Doug Epps, Kentfield, CA (US)

(73) Assignee: Imagemovers Digital LLC, Burbank, CA (US)

( * ) Notice: Subject to any disclaimer, the term of this patent is extended or adjusted under 35 U.S.C. 154(b) by 1035 days.

(21) Appl. No.: 12/507,306

(22) Filed: Jul. 22, 2009

(65) Prior Publication Data

US 2011/0018862 A1    Jan. 27, 2011

(51) Int. Cl.
*G06T 13/00*    (2011.01)
*G06T 13/40*    (2011.01)
*G06T 15/00*    (2011.01)

(52) U.S. Cl.
CPC .................................. *G06T 13/40* (2013.01)
USPC .......................................... 345/473; 345/419

(58) Field of Classification Search
CPC ...... G06F 3/011; G06T 13/40; G06T 2213/08
USPC ................... 345/419, 501; 382/103
See application file for complete search history.

(56) References Cited

U.S. PATENT DOCUMENTS

| 4,852,988 | A | * | 8/1989 | Velez et al. | 351/210 |
| 5,481,622 | A | * | 1/1996 | Gerhardt et al. | 382/103 |
| 6,091,378 | A | * | 7/2000 | Richardson et al. | 345/7 |
| 6,243,076 | B1 | * | 6/2001 | Hatfield | 345/156 |
| 6,535,215 | B1 | * | 3/2003 | DeWitt et al. | 345/473 |
| 6,603,491 | B2 | * | 8/2003 | Lemelson et al. | 715/784 |
| 6,657,628 | B1 | * | 12/2003 | Cook | 345/473 |
| 8,259,117 | B2 | * | 9/2012 | Shuster et al. | 345/474 |
| 2003/0123027 | A1 | * | 7/2003 | Amir et al. | 351/209 |
| 2003/0169907 | A1 | * | 9/2003 | Edwards et al. | 382/118 |
| 2005/0089212 | A1 | * | 4/2005 | Mashitani et al. | 382/154 |
| 2010/0045933 | A1 | * | 2/2010 | Eberl et al. | 351/210 |

OTHER PUBLICATIONS

Rodriguez et al.; A New Method for Iris Pupil Contour Delimitation and its Application in Iris Texture Parameter Estimation; 2005; CIARP 2005, LNCS 3773, pp. 631-641.*
Wolff, R., Roberts, D., Murgia, A., Murray, N., Rae, J., Steptoe, W., . . . & Sharkey, P. (Oct. 2008). Communicating eye gaze across a distance without rooting participants to the spot. In Proceedings of the 2008 12th IEEE/ACM International Symposium on Distributed Simulation and Real-Time Applications (pp. 111-118). IEEE Computer Society.*

* cited by examiner

*Primary Examiner* — Hau Nguyen
*Assistant Examiner* — Ryan M Gray
(74) *Attorney, Agent, or Firm* — Kilpatrick Townsend & Stockton LLP

(57) ABSTRACT

Any image capturing system, and a method to use same, that includes one or more image capturing devices that have known and fixed positions relative to one another and the eye of a subject, wherein the image capturing devices capture a plurality of images of eye of a subject during a performance is disclosed. The images of the eye, along with the known and fixed relative positions of the image capturing devices are used define eye-lines for the eye of the subject. The eye-lines can then be used to manually or automatically retarget the eye of a rendered or animated figure based on the performance of the subject to retarget the gaze intent of the rendered or animated figure within a scene.

20 Claims, 7 Drawing Sheets

US 8,860,729 B2

GAZE INTENT ESTIMATION FOR RETARGETING OF CHARACTERS

BACKGROUND OF THE INVENTION

Computer aided animation techniques have advanced dramatically in recent years. In particular, the animation of human, animal and fantastical figures has become increasingly more realistic. Contemporary computer animated figures appear to have natural body, head and facial movements. However, despite the advances in animating realistic facial movements and expressions, animators still struggle with the difficulties of animating realistic or lifelike eye movements.

In the absence of realistic or lifelike eye movements, the eyes of animated figures tend to remain fixed relative to the movements of the figures' head and body. People are very attuned to eye contact and eye movement, and imperfect or unnatural eye movements can be very conspicuous, if not off putting at times. When the eyes of an animated figure do not move as they are expected to move or as a real animal or human actor would move, the figures appear to be dead or "zombie-like" and thus produces a less than realistic or unbelievable rendering.

Various techniques have been developed to correct the look and feel of animated eyes in animated figures. However, the techniques typically used to correct or retarget animated eyes require either expensive eye specific animation in addition to the body and face animation or arduous and some what impractical manual corrections. Such solutions are only truly usable if the animator has sufficient time or computing power to correct the deadness of animated eyes. As such, solutions that require significant processor or animator time are not useful for real-time rendering such as that found in computer and video games were zombie-like eyes are problematic and ubiquitous.

It is clear that there is a need for a system and method to correct the gaze of animated eyes of animated figures that does not require expensive amounts of computer processor or animator time. Embodiments of the present invention solve these and other problems.

BRIEF SUMMARY OF THE INVENTION

The present invention relates to computer aided image rendering and animation. More specifically, embodiments of the present invention relate to rendition and animation of the eyes of rendered and animated figures in response to rearrangement or motion of the figures.

Embodiments of the present invention include methods of using a computer aided animation or rendering system for retargeting the eyes of animated or rendered images. Such methods comprise providing a plurality of cameras with known positions relative to an eye of a subject actor and capturing a plurality of images of the eye of the subject actor. Next the eye-line, or gaze-line, of the eye of the subject actor is determined in response to the images of the eye of the subject actor. Using an eye model and the known positions of the plurality of cameras, a gaze-object at which the eye of the subject actor is aimed in response to the eye-line is determined. When a change in position of the gaze-object relative to the rendered figure is received, the eye-line of the eye model is adjusted to remain on the gaze-object. Finally, an image of the eye of the subject actor is rendered in response to the adjusted eye-line of the eye model and the rendered image with the adjusted imaged of the eye is displayed on an output device.

Other embodiments of the present invention include an apparatus for retargeting the gaze of rendered images. The apparatus comprises a plurality of imaging devices configured to maintain a constant position and orientation relative to the eyes of a subject actor and a computer system in communication with the plurality of imaging devices, wherein the computer system comprises one or more digital eyes models.

Some embodiments of the present inventions include methods for using a computer aided animation system to retarget the gaze of a rendered figure in real-time. The method comprises defining an eye-line of an eye model for the rendered figure and determining a designated gaze-object at which one or more eyes of the rendered figure is aimed in response to the eye-line. When a change in position of the designated gaze-object relative to the rendered figure is received, the eye-line of the eye model is adjusted to remain on the designated gaze-object after the change in position. Finally, the eye model for the rendered figure is rendered in response to the adjusted eye-line of the eye model and the rendered figure and the adjusted rendered eye model is displayed on an output device.

BRIEF DESCRIPTION OF THE DRAWINGS

FIG. 2B illustrates a schematic of a head mounted image-capturing device in FIG. 1A in use according to various embodiments of the present invention.

DETAILED DESCRIPTION OF THE INVENTION

Figure 1A:
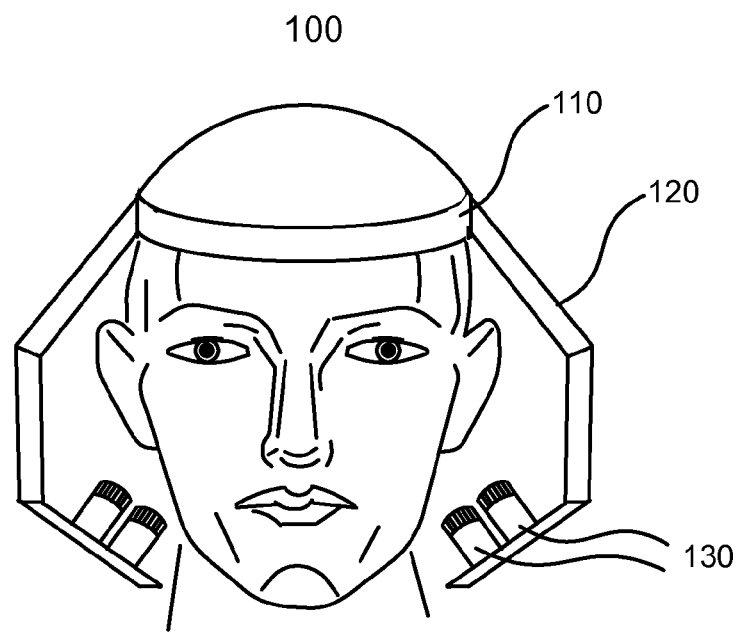
FIG. 1A illustrates a head mounted image-capturing device according to various embodiments of the present invention.

FIG. 1A illustrates a head mounted image capturing system 100 according to various embodiments of the present invention. Image capturing system 100 includes one or more arms 120 rigidly or adjustably mounted to a headband 110. In various embodiments, it is desirable for headband 110 and arms 120 to remain substantially if not completely stationary relative to the head of the subject. Image capture system 100 also includes cameras 130 mounted to the ends of arms 120. As it is desirable for the headband 110 and arms 120 to remain stationary relative to the head of the subject, it is also desirable for cameras 130 to remain stationary relative to the eyes of the subject. In various other embodiments each arm 120 has at least two cameras 130 on the end of each arm.

Cameras 130 can be any suitable type of imaging device. For example, cameras 130 can be digital video cameras based on CCD, CMOS or other appropriate digital imaging chips. In various embodiments, the cameras can be outfitted with specialized filters to isolate selectively certain features of the eyes of the subject. For example, IR filters can be used to isolate IR illumination reflected off of the retina of the eye of the subject. In such embodiments, the subject can be illuminated with either an ambient infrared light source, collimated light source on axis with one or more of cameras 130 or a point source mounted on one or more of arms 120. One of ordinary skill in the art will recognize that various visible and invisible illumination sources can be used to detect various features of a subject's eye to determine the direction in which the eyes are directed. In scenarios in which a specialized visible or invisible illumination source is used, it can be beneficial to use one or more reflective or absorptive optical filters to isolate the features of the subject's eyes that will be used to determine the direction in which the eyes are directed. One of ordinary skill in the art will recognize that various combinations and types of optical filters can be used to isolate one or more features of a subject's eye depending on feature to be detected and the type of illumination used.

In various embodiments, the image capturing system 100 can be in communication with a computer system. The communication can be accomplished via any wired or wireless data connection. In various other embodiments, image capturing system 100 can be a stand alone device comprising a processor and a memory for recording the images captured by cameras 130.

In various embodiments, the relative positions of cameras 130 to the eyes of the subject are known and constant. By determining the relative positions of cameras 130 to the eyes of the subject it is possible to determine the direction in which the eye or eyes of the subject are directed by looking at various features in images of the subject's eyes captured by cameras 130. In some embodiments, the features can be simple images of the subject's eyes and the relative position of the different parts of the eyes within the image or frame. In such embodiments, the location of the pupil of the subject's eye can be measured and tracked to determine the direction in which the eye is targeted.

In various embodiments, to build a database of correlation of the images of the subject's eyes and direction in which the subject is looking, images of the subject's eyes can be captured while looking at many preset locations or objects at various distances and angles from the subject. The angle, distance, size, type, brightness or nature of the target location or objects relative to the subject actor can be correlated to the position, size and shape of the subject's eyes. The correlation can then be stored in a look-up table or database for later use in rendering or animating the eyes of one or more rendered or animated figure. In some embodiments, the look-up table or database of correlations can be associated with one or more rendering or animating rigs or preset animation modules. In such embodiments, the look-up table or database can then be called manually or automatically from within a rendering or an animation system when the associated rig or module is loaded or used.

In some embodiments, it is possible to interpolate the expected position, size and shape of a subject's eye for angles, distances, sizes, types or brightness of locations or objects between the many preset locations or objects for which the subject's eye is sampled while building the look-up table or database. In such embodiments, the size of the database can be reduced by providing a look-up table with one or more interpolation formulas or schemes to determine intermediate positions and orientations of the subject's eye not discretely stored in the database. One of ordinary skill in the art will recognize that size and complexity of a look-up table or database can be customized based on any number of considerations including, but not limited to, resolution of the final rendered or animated figures, the amount of memory or storage available and the range or type of movement expected in the rendered or animated figures.

Figure 1B:
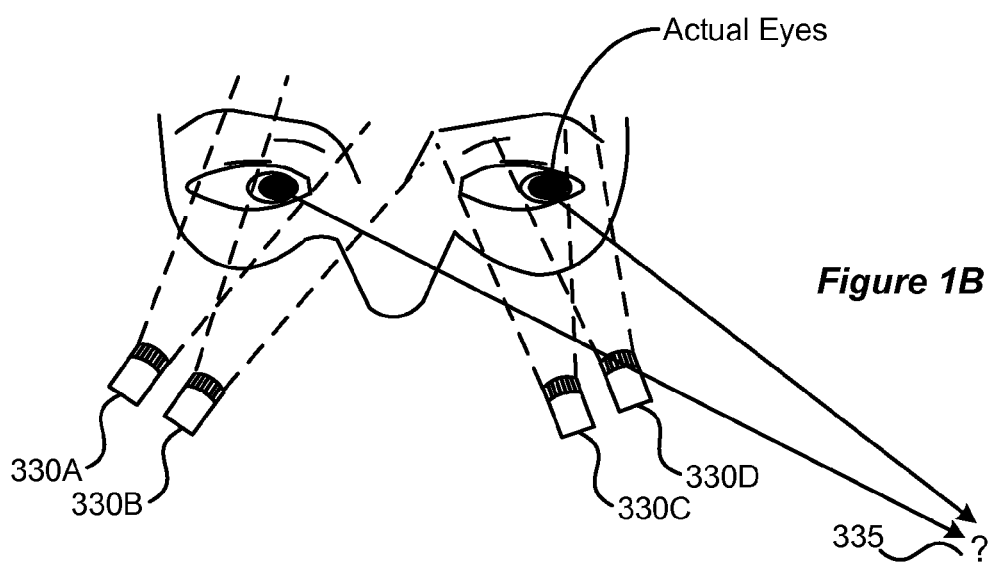
FIG. 1C illustrates an example of image frames captured by the headgear image-capturing device in FIG. 1A according to various embodiments of the present invention.
FIG. 1D illustrates a scenario in which images of the eyes of a subject are captured according to various embodiments of the present invention.
FIG. 1E illustrates a scenario in which the rendered eyes of a rendered model are shifted based on the change in gaze of the rendered eyes according to various embodiments of the present invention.

FIG. 1B illustrates a scenario in which cameras 330A through 330D capture an image of an eye that is looking at some location or object 335. As shown in FIG. 1B, camera 330A and camera 330B are positioned at fixed and known locations relative to each other and the subject's right eye. Cameras 330C and 330D are positioned at fixed and known locations relative to each other and the subject's left eye. Each camera 330A through 330D can capture an image of either the right eye or the left eye of the subject. Because cameras 330A and 330B are side-by-side they inherently have slightly different perspectives of the subject's right eye. Similarly, cameras at 330C and 330D inherently have slightly different perspectives of the subject's left eye. This difference in perspective provides capability for stereoscopic images of each of the subject's eyes.

Figure 1C:
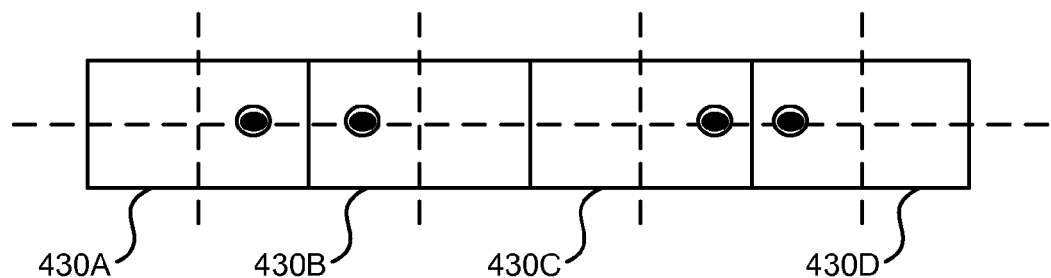

FIG. 1C depicts sample frames from a video feed captured by cameras 330A through 330D. As shown, in some embodiments, each frame can have a centered relative rectilinear coordinate system. Those skilled in the art will recognize that many coordinate systems may be used without deviating from the scope and spirit of the present invention. In various embodiments, the pixel coordinates of the center of the image of the eye can be used as an internal coordinate system to determine the location and direction in which he imaged eye is directed. For example, in an imager chip with 100-by-100 pixel array, the center of the pupil may be determined to be located at a particular pixel or pixel region designated by one or more ordered pair such as an x-y coordinate of (45,60) or a rectangular region bound by two x-y coordinates such as (30,30) to (32,33).

As shown in FIG. 1C, each camera in FIG. 1B 330A through 330D produces a corresponding frame or video feed. For purpose of illustration only, FIG. 1C shows still image frames 430A through 430D. Image frame 430A corresponds to an image frame captured by camera 330A. Image frame 330B corresponds to an image captured by camera 330B. Similarly, image frames 430C and 430D correspond to image frames captured by cameras 330C and 330D, respectively. As mentioned above, image frames can be still images from each of the individual cameras or they can comprise many frames in series as a video feed. When the image frames comprise one or more video feeds, then some embodiments of the present invention can also be used to track the movements of a subject's eye. Such embodiments can be particularly useful in motion capture systems in which the movement of a subject actor is the basis for rendering an animated figure.

FIG. 1C also shows how the position of the eye of the subject is different in the frames due to the fact that the cameras are positioned side-by-side to another. The axial offset of one camera to another produces a different perspective of the frames captured by each camera. FIG. 1B illustrates how each camera has a field of view that is slightly different from the camera next to it. Camera 330A is positioned to the right of the subject's right eye and as such when the subject looks left the center of the subject's right eye will be in the right side of camera 330A's field of view. This is illustrated schematically in FIG. 1B by the dotted lines outlining the field of view of cameras 330A through 330D. Furthermore, as seen in FIGS. 1B and 1C the right eye of the subject is in the left side of camera 330B's field of view and therefore the image of the eye and image frame 430B from camera 330B is in the left portion of the image. Similarly, cameras 330C and 330D are positioned in front of and aim at the subject's left eye. When the subject looks left the center of the subject's left eye will be in the right side portion of camera 330C's field of view but in the left portion of camera 330D's field of view. Consequently the image of the eye in F*igure* 430C is in the right side portion of the image and the image of the eye in F*igure* 430D is the left portion of the image.

Information regarding the location of the image of the subject's eye in the image frames 430A through 430D can be used to interpolate gaze-lines from the center of each of the subject's eyes to an actual or virtual object 335. The location of the actual or virtual object can be approximated or pinpointed by determining the intersection point of the gaze-lines coming from each of the subject's eyes. Once the gaze-lines from each of the subject's eyes are determined based on the image frames 430A through 430D, they can be locked onto whatever actual or virtual object or location is determined by the intersection of the gaze-lines. Once the gaze of the subject or subject actor is determined, the gaze-line information can be applied to an animated model of the subject's eyes. In some embodiments, the location of the virtual object or location can be changed relative to the animated figure based on the movements of the subject. In some embodiments, the gaze-line information can be applied to one or more animated eyes of a fanciful or fictitious figure or character that may have more than two eyes per character. In such embodiments, an array of more than two eyes can be controlled or animated by reference to only one or two eyes of a subject actor.

Figure 1D:
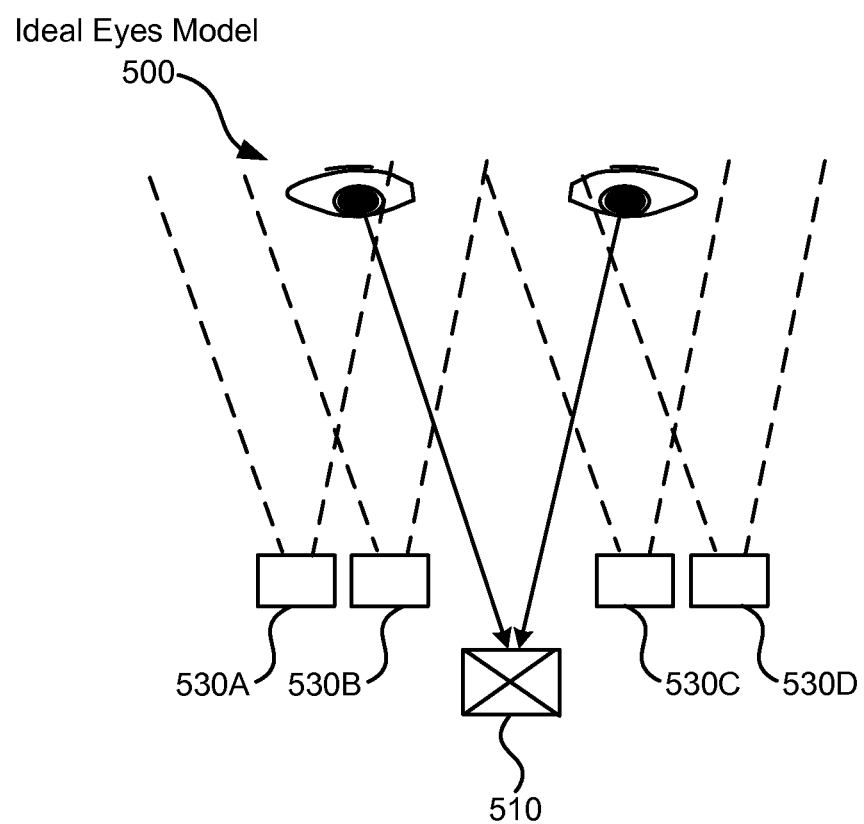

FIG. 1D is a diagram of ideal eye models animated in a virtual space. In some embodiments the ideal eye models are digital eye model simulated in a virtual space. The ideal eye models are positioned in the virtual space with the same relative position and orientation of virtual cameras 530A through 530D and then based on the location of the virtual object location relative to the eyes of the subject, a virtual object 510 can be placed in the virtual space. Once this relationship is determined, either ideal eye model 500 or virtual object 510 can be moved relative to another while maintaining gaze-lines that connect the idealized model 500 to the virtual object 510. In this way an animated figure will appear to have his attention remain on the location or object on which he is supposed to be focused. As used herein, the term gaze intent refers to the direction of an animated figure's eyes in relation to the location, object or other animated figure on which the animated figure is focused as indicated by the gaze-line or eye-lines emanating from some point on the ideal model eyes. Maintaining realistic gaze intent is often the crux of realistic animation. Explanation of this effect and detailed examples follow.

As shown in FIG. 1D ideal eyes model 500 have their gaze intent focused on virtual object 510. In the course of animating a figure to which ideal eyes model 500 belong, the relative orientation and position of the figure and the virtual object 510 might change. Such changes commonly occur when the original composition of a scene or frame changes due to one of many possible design or animation choices. For example, an animated human figure may be placed in a frame or a scene in which she is looking at another animated human figure. Over the course of the scene both of the animated human figures may move relative to one another. If the eyes of each of the animated human figures remained fixed or constant, there would be no sense that the animated human figures were looking at each other or even interacting with one another. The importance of eye movement in animated figures is important in creating realistic animated interactions between one animated figure and another animated figure or the animated surroundings.

Figure 1E:
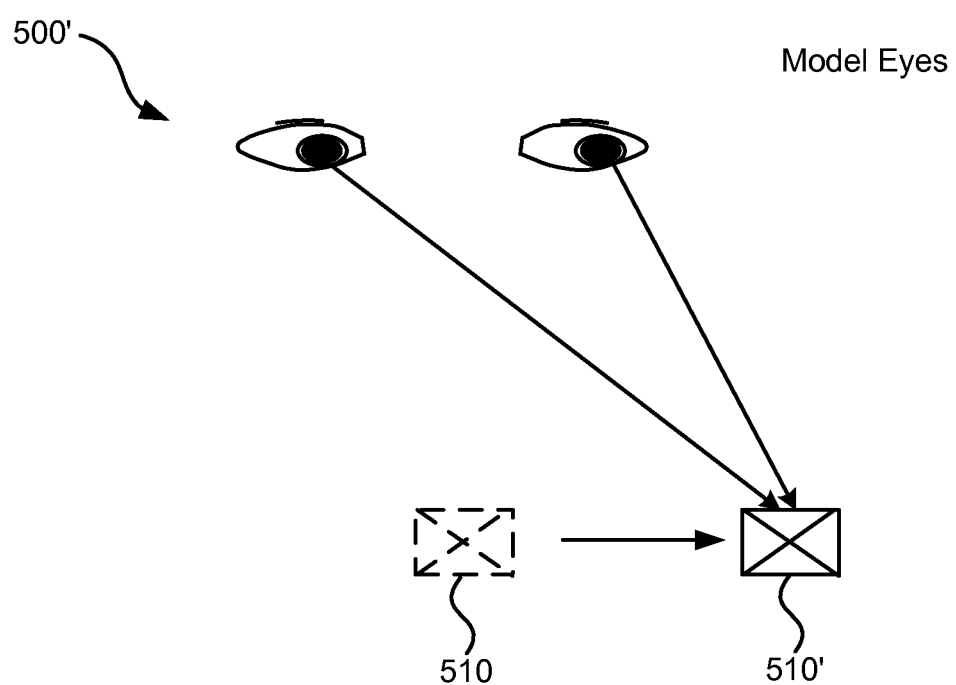

FIG. 1E illustrates how the gaze-lines, and consequently the position of the ideal eyes relative to the head of an animated figure, change when the virtual object on which the gaze-lines are locked moves within the scene. As shown in FIG. 1E virtual object 510 is shifted to the right to the position of 510'. In various embodiments, the animated eye models can be moved to any location in the animated scene by moving the virtual object on which the gaze-lines of the model eyes are locked. In various other embodiments, the gaze intent of the animated eye models can change from one virtual object to another virtual object based on the data gathered by the image capture device 100. It is clear that a single subject actor on which an animated figure is based can change his attention and consequently his gaze intent many times during animated scene. This can occur when the subject actor interacts with two or more subject actors or turns his gaze from one object to another while taking in the scene.

Figure 2:
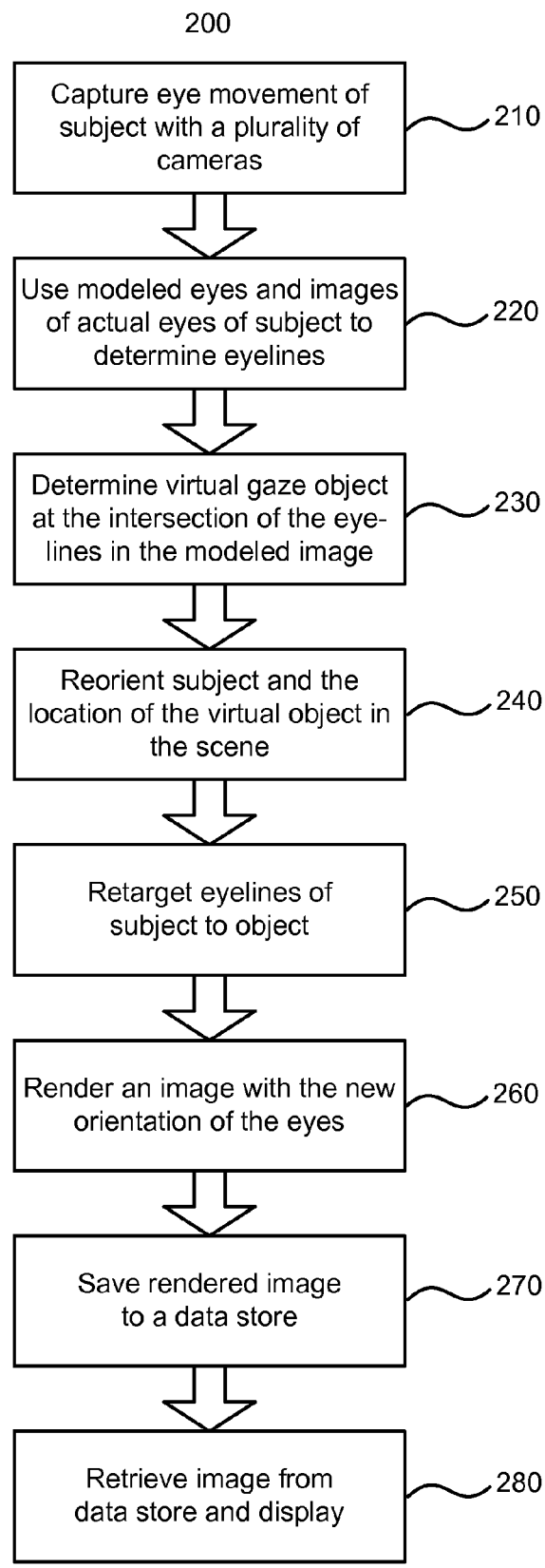
FIG. 2 depicts a flow chart of a method for retargeting the eyes of an animated or rendered figure according to various embodiments of the present invention.

FIG. 2 is a flowchart of a method 200 for correcting the gaze intent of an animated figure based on performance data of a subject actor 100 according to one embodiment of the present invention. At step 210 the eye movements of a subject actor are captured with a plurality of cameras. The subject actor can be either a human actor or animal actor. In various embodiments of the present invention, the plurality of cameras can be fixed with known relative spatial positions to the eyes of the subject actor. In various embodiments, the eye movements of the subject actor are recorded as a series of still images. In various other embodiments, the eye movements of the subject actor are recorded as a video stream. In yet other embodiments, the eye movements of the subject actor are recorded as a series of displacements of one or more points on each of the subject actor's eyes. For example, if only the right eye is considered for simplicity sake, it would be possible to track the position of the center of the subject actor's pupil as a series of two-dimensional displacements. According to some embodiments of the present invention, a series of displacements can be tracked in a Cartesian coordinate system, a polar quarter system or any other appropriate or convenient coordinate system. In various embodiments, the coordinate of the center of the subject actor's pupil can be captured with some frequency F. As such, the higher the frequency, the more real-time the data would be. Having a frequency of pupil displacement sampling of approximately 10 Hz to 60 Hz would allow for animated eye models to approximate saccade eye movement. In various embodiments, the rate at which the eye-line for the rendered figure may change, and may be limited. For example, the animated figure may have their eye-line repeatedly shift between two objects within a scene, however the rate at which the animated figure's eyes can move and lock onto one object or the other object may be limited depending upon the user's requirements.

In various embodiments, once the eye movements of the subject actor are captured, either the images or the series of displacements can be used with a set of model animated eyes in step 220 to determine the eye-lines or gaze-lines of the subject actor's eyes. As used herein, the terms eye-lines or gaze-lines can be used interchangeably. Both terms refer to interpolated lines that indicate the direction in which either a real or a model eye is directed. For example, an eye-line can be a line that connects the point at the center of the subject actor's pupil with the center of the actor's fovea region on his retina. In other embodiments, the eye-line can be defined as a ray extending out perpendicularly from the apex of the subject actors cornea. It will be apparent to those with ordinary skill in the art that the eye-line can be defined as any line extending from the eyes without deviating from the spirit or scope of the present invention.

In various embodiments, once the gaze-lines are determined, they can be interpolated and extended out to the point at which the gaze-lines from each of the subject actor's eyes intersect in step 230. Once the gaze-lines are determined, they can be stored for later retrieval and use in real-time animation such as in computer or video games or post production work for animated sequences. In some embodiments, the gaze-line data is stored for a plurality of predetermined model eye orientations and poses. In such embodiments, a database or a single record of gaze-lines can be called on to be used in manual or automatic gaze-line adjustments or model eye retargeting.

The point at which the gaze-lines intersect can be considered a virtual point of interest. The virtual point of interest can be either a virtual gaze location or virtual gaze-object. In either case the point of interest can be fixed on a particular virtual location or virtual gaze-object for any given scene. This is not to say that the point of interest cannot move relative to the subject actor or to the subject actor's eyes. While capturing the eye movements of the subject actor, it is highly likely that the actor will have multiple points of interest during his performance. Based on the recorded eye movements, the virtual point of interest can be changed in real time or in post production to correspond to either a change in the subject actor's interest or movement of the subject actor relative to the virtual gaze location or virtual gaze-object. Using the information of the virtual point of interest, the animation based on the subject actor's performance and eye movements can be enhanced with the rendering of realistic eye movements.

In various embodiments, the virtual gaze-objects can be added as either visible or invisible gaze-objects in an animated scene. In some embodiments the virtual gaze-objects can be animated objects with which the animated figure interacts in the animated scene. Thus, either or both of the animated figure and the virtual gaze-object in the animated scene can change positions relative to one another in step 240. This can often happen when the animated scene is redesigned or edited for one or more of a multitude of reasons. For whatever reason the animated scene is changed, the eye-lines that are directed to a virtual gaze-object or location in the animated scene can be changed to compensate for the movement of the animated figure and the virtual gaze-object. In step 250, the retargeting of the eye-lines of the subject actor can be completed manually or automatically. In various embodiments, the retargeting of the eye-lines is completed automatically by locking the intersection point of the eye-lines emanating from each one of the subject's eyes on a particular virtual gaze-object or location. Since the intersection point of the eye-lines is fixed, any movement of the virtual gaze-object or the subject will indicate that the eye will have to move to maintain the focus of the intersecting eye-lines.

In step 260, the images of the animated eye are rendered such that the eye-lines maintained their intersecting point on the virtual gaze-object of interest. As previously mentioned, the orientation of the eyes and the animated figure may need to be rendered more than once per animated scene. In various embodiments, the subject actor may have been focused on the wrong point of interest during his performance. In such scenarios, it is possible to retarget the rendered animated eye so that it is focused on the correct point of interest while rendering the animated scene.

Finally, in step 270 each rendered image of the animated figure in the animated scene and the retargeted animated eyes can be stored to a computer readable medium or data store. Once the rendered images are saved to a data store in step 270 they can later be retrieved and displayed in step 280.

Embodiments of the present invention are also useful for retargeting the position of animated eyes in real-time rendering such as that used in video or computer games. Just as described above, the eye-lines or gaze-lines for a modeled animated eye can be defined for any animated eye. In some embodiments, the eye-lines can be manipulated in real-time to place the intersection point of the eye-lines emanating from each of the animated figure's eyes onto an animated gaze-object or location. Each potential animated gaze-object or location in any particular scene of a real-time rendered image can be designated with an underlying point of interest code. As a real-time animated scene develops, one of the many possible points of interest can be designated as the current point of interest for any of the animated figures in the scene. By assigning a point of interest to each of the animated figures in the scene by assigning it a point of interest code, the intersection of the eye-lines emanating from the eyes of that particular animated figure can be locked onto the point of interest with the corresponding point of interest code.

For example, two characters in video game can move interactively within an animated scene independently of one another. The scenario in the videogame may dictate that the two characters are focused on another. Therefore, according to one embodiment, each of the two characters would be assigned a point of interest code corresponding to the other character. For instance, suppose the first character is designated point of interest X1 and the second character is designated point of interest X2, therefore the first character would be assigned a point of interest code X2 on which to be focused and the second character would be assigned a point of interest code X1 on which to be focused. Once the point of interest codes are assigned, the eyes of each character can track the other no matter where they go in the animated scene. The first character and the second characters' eyes will remain locked on one another indicating that the other character is its point of interest. In some embodiments, the point of interest on a designated point of interest can vary over the entire range of the designated point of interest. For example, the designated point of interest can be a large tree. The point of interest on that large tree can be at the top of the tree or the base of the tree and as such, the location of the intersection of the gaze-lines will move accordingly and retarget the eyes of an animated figure. The automated and manual methods of retargeting the gaze intent of animated figure in animated or rendered scene is described in more detail in reference to FIGS. 3A and 3B below.

Figure 3A:
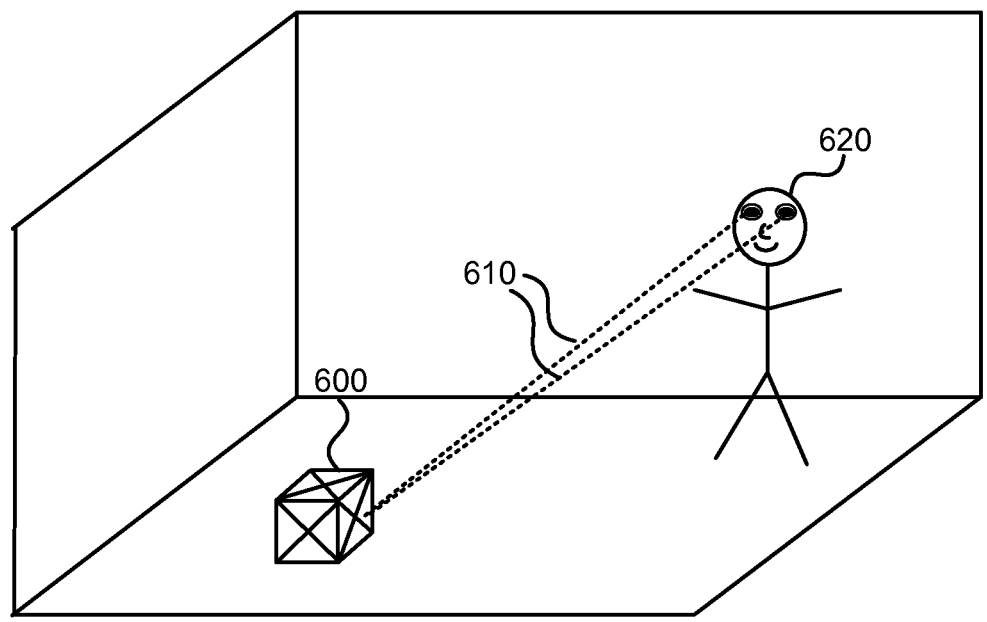
FIG. 3A depicts an animated scene in which an animated figure has his gaze directed at an object in a first position according to various embodiments of the present invention.
Figure 3B:
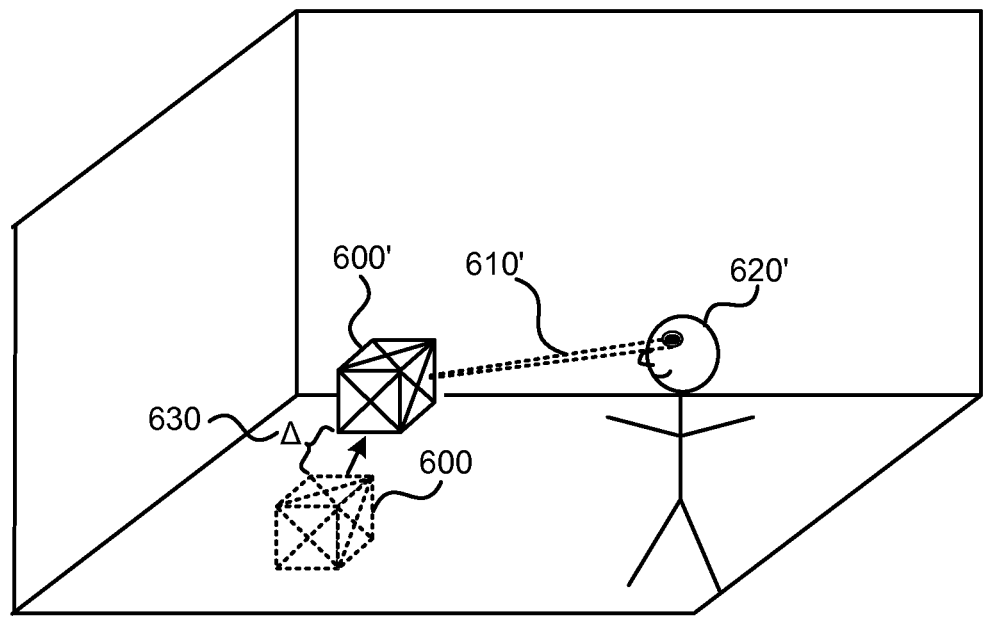
FIG. 3B depicts an update of the animated scene depicted in FIG. 3A in which the animated figure has his gaze shifted to track the shift of the object from the first position to a second position according to various embodiments of the present invention.

FIGS. 3A and 3B show two different moments in the same animated scene. In FIG. 3A animated figure 620 is looking at gaze-object 600. Animated figure 620 can be based on the performance data of a subject actor captured with a motion capture system. In some embodiments animated figure 620 can be a real-time rendering of a character in a computer or video game. The eyes of animated figure 620 are directed at gaze-object 600 as indicated by eye-lines 610. As shown in FIG. 3A eye-lines 610, one emanating from each eye of the animated figure 620, intersect at gaze-object 600. In various embodiments, gaze-object 600 can be visible or invisible in the animated scene. In the scenario in which gaze-object 600 is invisible, it can be used to direct the gaze of the animated figure 620 to a point of interest not in the animated scene.

As discussed above, gaze-object 600 can be determined based on images of the subject actor's eyes captured with the image capturing system 100. At some later time, the rendered animated scene changes either because the scene develops over time or the design or layout of the scene is altered. FIG. 3B shows how both the animated FIG. 620 and gaze-object 600 have changed positions within the rendered animated scene relative to one another. Object 600 has been moved along path 630 and is now in a position indicated by gaze-object 600'. Meanwhile animated FIG. 620 has moved forward in the scene to a location indicated by animated FIG. 620. Despite the change in relative positions within the animated rendered scene, animated FIG. 620's eyes are still locked on gaze-object 600' as indicated by eye-lines 610'.

Figure 3C:
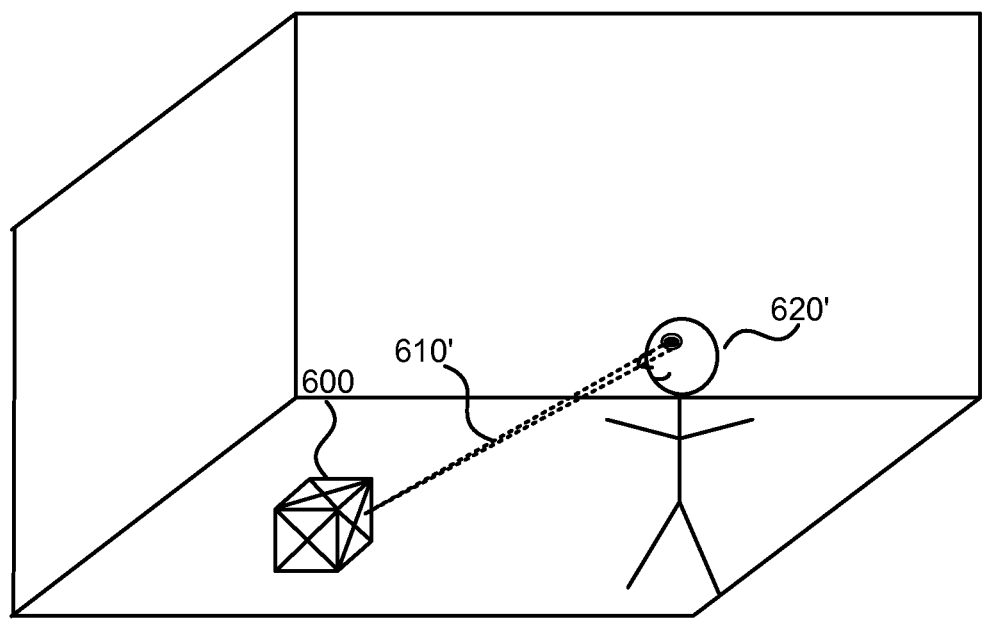
FIG. 3C depicts an animated scene that can be improved by various embodiments of the present invention.

FIG. 3C illustrates a scene in which only FIG. 620' is moved to the front of the animated scene. As discussed above, the eyelines can be retargeted to compensate for the movement of FIG. 620' to either manually or automatically maintain the gaze intent of FIG. 620' on the gaze-object 600 as indicated by eye-lines 610'. In some embodiments, the allowable movement of the eyes of in retargeting the gaze intent is linked to the movement of the head or other physical features of the animated figure to avoid the eyes from being directed in unnatural ways. For example, if FIG. 620' had turned its body away from gaze-object 600, then it would be unnatural for the eye-lines to remain locked onto gaze-object 600 without moving the head, neck and shoulders of FIG. 620' to look backward at the gaze-object 600. Without associating the movement of the eyes of an animated figure with the head and body movements of the FIG. 620', then it would be possible to achieve the undesirable result of the animated eyes pointing backward into the head of the FIG. 620'. In some embodiments, the eye-lines are constrained to move over a define range relative to an animated figure such that any retargeting of the eye-lines will necessarily require an adjustment of at least one other part of the animated figure manually or automatically. As merely an example, the muscles around the eye, the eyelids, the position of the head and shoulders, and the like may be influenced and modified depending upon the retargeted eye-lines.

Figure 4:
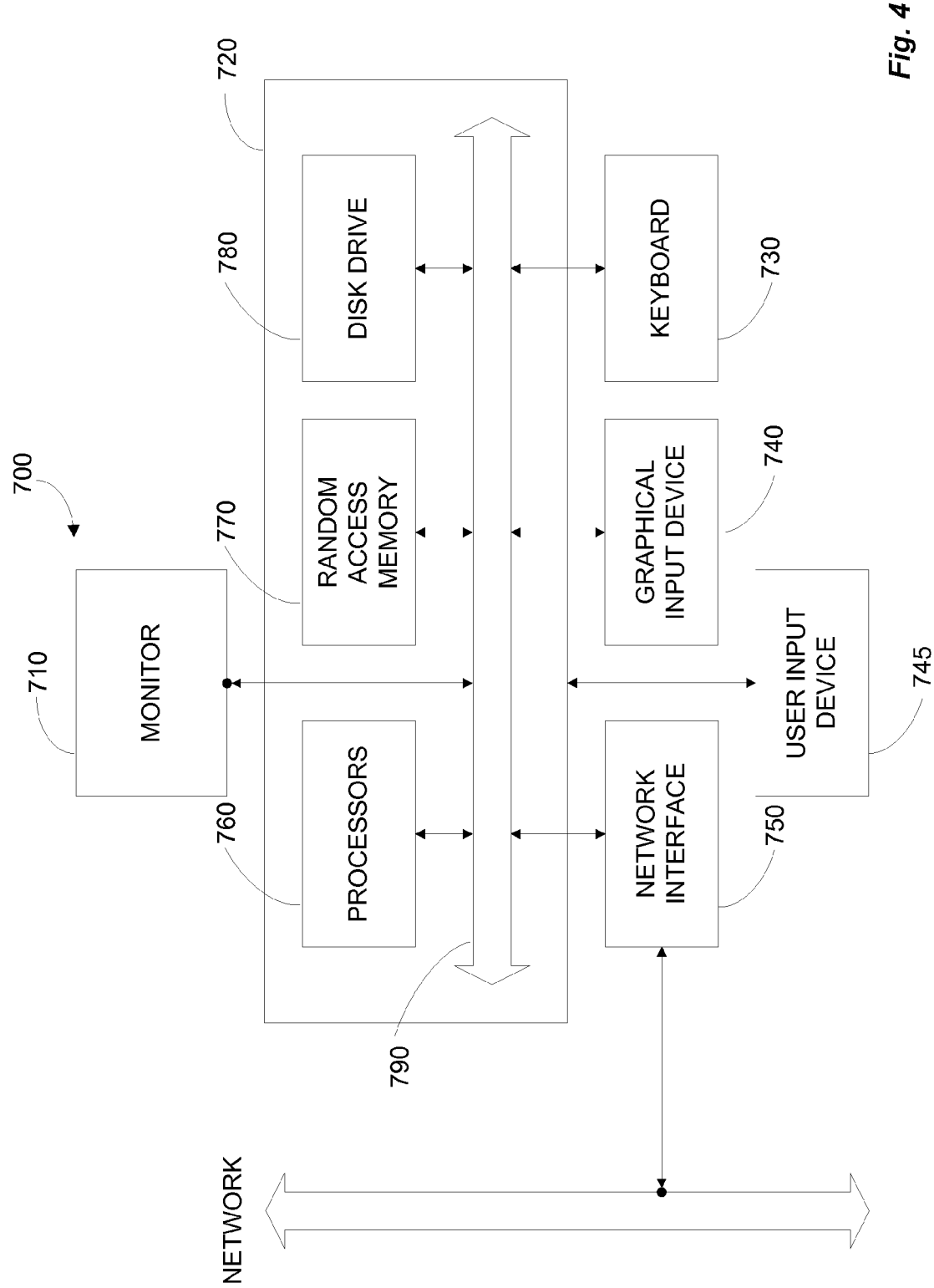
FIG. 4 is a schematic of a computer system that can be used to implement various embodiments of the present invention.

FIG. 4 is a block diagram of typical computer system 700 according to an embodiment of the present invention.

In the present embodiment, computer system 700 typically includes a display 710, computer 720, a keyboard 730, a user input device 740, computer interfaces 750, and the like. In various embodiments, display (monitor) 710 may be embodied as a CRT display, an LCD display, a plasma display, a direct-projection or rear-projection DLP, a microdisplay, or the like. In various embodiments, display 710 may be used to visually display user interfaces, rendered and animated images, as described above, or the like.

In various embodiments, user input device 740 is typically embodied as a computer mouse, a trackball, a track pad, a joystick, wireless remote, drawing tablet, voice command system, eye tracking system, and the like. User input device 740 typically allows a user to select objects, icons, text and the like that appear on the display 710 via a command such as a click of a button or the like. An additional specialized user input device 745 may also be provided in various embodiments. User input device 745 may include an image capturing device like the one described above in reference to FIG. 1A. In other embodiments, user input device 745 can include additional computer system displays (e.g. multiple monitors). Further user input device 745 may be implemented as one or more graphical user interfaces on such a display.

Embodiments of computer interfaces 750 typically include an Ethernet card, a modem (telephone, satellite, cable, ISDN), (asynchronous) digital subscriber line (DSL) unit, FireWire interface, USB interface, and the like. For example, computer interfaces 750 may be coupled to a computer network, to a FireWire bus, or the like. In other embodiments, computer interfaces 750 may be physically integrated on the motherboard of computer 720, may be a software program, such as soft DSL, or the like.

In various embodiments, computer 720 typically includes familiar computer components such as a processor 760, and memory storage devices, such as a random access memory (RAM) 770, disk drives 780, and system bus 790 interconnecting the above components.

In some embodiments, computer 720 includes one or more Xeon microprocessors from Intel. Further, in the present embodiment, computer 720 typically includes a UNIX—based operating system.

RAM 770 and disk drive 780 are examples of computer-readable tangible media configured to store data such as source image files, models including geometrical descriptions of objects, ordered geometric descriptions of objects, procedural descriptions of models, scene descriptor files, a rendering engine, embodiments of the present invention, including executable computer code, human readable code, or the like. Other types of tangible media include magnetic storage media such as floppy disks, networked hard disks, or removable hard disks; optical storage media such as CD-ROMS, DVDs, holographic memories; semiconductor media such as flash memories, read-only-memories (ROMS); battery-backed volatile memories; networked storage devices, and the like.

In the present embodiment, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit, GPU, may be used to accelerate various operations. Such operations may include manual retargeting of one or more animated figures eyes, designating a point of interest for a figure, manually adjusting the position of an animated eye, or the like.

FIG. 4 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

The specification and drawings are, accordingly, to be regarded in an illustrative rather than a restrictive sense. It will, however, be evident that various modifications and changes may be made thereunto without departing from the broader spirit and scope of the invention as set forth in the claims.

One or more features from any embodiment may be combined with one or more features of any other embodiment without departing from the scope of the disclosure.

All patents, patent applications, publications and descriptions mentioned above are herein incorporated by reference in their entirety for all purposes. None is admitted to be prior art.

What is claimed is:

1. In a computer aided animation system, a method for retargeting the gaze of a rendered image comprising:
   determining an eye-line of an eye model using a computer system, wherein the eye model is simulated in virtual space;
   determining a gaze-object at which the eye model is directed in response to the eye-line using the computer system, wherein the gaze-object is a moving object upon which the gaze is fixed;
   determining a relative change in position of the gaze-object relative to the eye model using the computer system;
   adjusting the eye-line of the eye model to remain on the gaze-object to remain on the designated gaze-object during the change in position, wherein the adjusting uses stored data including at least one correlation between an eye-line and an eye image;
   rendering an image of the eye model in response to the adjusted eye-line of the eye model using the computer system; and
   displaying the rendered image with an adjusted image of the eye on an output device using the computer system.

2. The method of claim 1 wherein the eye model comprises two or more model eyes, wherein the eye-line comprises two or more eye-lines and wherein determining the gaze-object at which the two or more eye models are aimed is in response to the two or more eye-lines.

3. The method of claim 1 further comprising:
   saving the rendered image to a memory store using the computer system; and
   retrieving the rendered image from the memory store using the computer.

4. The method of claim 1 further comprising:
   providing a plurality of imaging devices with known positions relative to an eye of a subject actor; and
   capturing a plurality of images of the eye of the subject actor with the plurality of cameras;
   wherein determining an eye-line of the eye model comprises determining an eye-line of the eye of the subject actor in response to the images of the eye of the subject actor, an eye model and the known positions of the plurality of cameras;
   wherein determining a gaze-object at which the eye model is directed comprises determining a gaze-object at which the eye of the subject actor is aimed; and
   wherein determining a relative change in position of the gaze-object relative to the eye model comprises determining a relative change in position of the gaze-object relative to the subject actor.

5. The method of claim 1 further comprising:
   providing a plurality of imaging devices with known positions relative to a first eye and a second eye of a subject actor;
   capturing a plurality of images of the first eye of the subject actor with the plurality of cameras; and
   capturing a plurality of images of the second eye of the subject actor with the plurality of cameras;
   wherein determining a first eye-line of the eye model comprises determining a first eye-line of the eye of the subject actor in response to the images of the first eye of the subject actor, an eye model and the known positions of the plurality of cameras;
   wherein determining a second eye-line of the eye model comprises determining a second eye-line of the eye of the subject actor in response to the images of the first eye of the subject actor, the eye model and the known positions of the plurality of cameras;
   wherein determining a gaze-object at which the eye model is directed comprises determining a gaze-object at which the first eye and the second eye of the subject actor are aimed; and
   wherein determining a relative change in position of the gaze-object relative to the eye model comprises determining a relative change in position of the gaze-object relative to the subject actor.

6. The method of claim 4 wherein the plurality of cameras have known positions relative to the eye of the subject actor and comprise two or more cameras for the eye of the subject actor.

7. The method of claim 1 wherein the model eye comprises a digital model of an ideal eye.

8. The method of claim 7 wherein determining the gaze-object comprises determining where the two eye-lines intersect.

9. An apparatus comprising:
   a plurality of imaging devices configured to maintain a constant position and orientation relative to the eyes of a subject actor;
   a computer system in communication with the plurality of imaging devices, the computer system configured to determine the position of a gaze-object based on the intersection point of the gaze-lines of the eyes of the subject actor, wherein the gaze-object is a moving object upon which the gaze is fixed; and a model of the eyes of the subject actor, wherein the model is a digital model simulated in a virtual space, wherein eyes of the digital model are animated based on the gaze-lines of the subject actor.

10. The apparatus of claim 9 wherein the plurality of imaging devices are attached to the ends of a plurality of arms, wherein the arms are rigid and securely attached to a head gear adapted to be securely attached to the head of a subject actor.

11. The apparatus of claim 10 wherein the plurality of imaging devices comprises two cameras with known locations relative to one another for each eye of the subject actor.

12. The apparatus of claim 11 wherein the plurality of imaging devices are configured to image the two eyes of the subject actor from two different perspectives.

13. The apparatus of claim 9 wherein the computer system is in communication with the plurality of imaging devices via wireless connection.

14. The apparatus of claim 9 wherein the at least one of the plurality of imaging devices is configured to detect illumination outside of the human visible range.

15. The apparatus of claim 10 wherein the subject actor is human.

16. The apparatus of claim 10 wherein the subject actor is an animal other than human.

17. In a computer aided animation system, a method for retargeting a gaze of a rendered figure in real-time comprising:
- retrieving an eye-line of an eye model to a designated gaze-object, wherein the eye model is simulated in virtual space, wherein the gaze-object is a moving object upon which the gaze is fixed,
- determining a relative change in position of the gaze-object relative to a subject actor;
- adjusting the eye-line of the eye model to remain on the designated gaze-object after the change in position, wherein the adjusting uses stored data including at least one correlation between an eye-line and an eye image;
- rendering the eye model for the rendered figure in response to the adjusted eye-line of the eye model; and
- displaying the rendered figure and the adjusted rendered eye model on an output device.

18. The method of claim 17 wherein the eye model is constrained to adjust only in a forward direction relative to the rendered figure.

19. The method of claim 17 wherein the defined eye-line is a ray extending perpendicularly from the apex of the cornea.

20. The method of claim 17 wherein the change in position of the gaze-object relative to the rendered figure comprises a change in the designated gaze-object from a first designated gaze-object to a second designated gaze-object.

* * * * *

UNITED STATES PATENT AND TRADEMARK OFFICE
CERTIFICATE OF CORRECTION

| | | |
|---|---|---|
| PATENT NO. | : 8,860,729 B2 | Page 1 of 1 |
| APPLICATION NO. | : 12/507306 | |
| DATED | : October 14, 2014 | |
| INVENTOR(S) | : Doug Epps | |

It is certified that error appears in the above-identified patent and that said Letters Patent is hereby corrected as shown below:

On the Title page of the Letter Patent:

Item (57), subsection, ABSTRACT, line 1:

Please delete "Any"; and
Please insert --An--

Signed and Sealed this
Thirtieth Day of December, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,860,729 B2
APPLICATION NO. : 12/507306
DATED : October 14, 2014
INVENTOR(S) : Doug Epps It is certified that error appears in the above-identified patent and that said Letters Patent is hereby corrected as shown below:

ON THE TITLE PAGE

Item (73), subsection, ASSIGNEE, line 4:

Please delete "Imagemovers Digital LLC, Burbank, CA (US)"; and
Please insert --Two Pic MC LLC, Burbank, CA (US)--

Signed and Sealed this
Seventh Day of June, 2016

Michelle K. Lee
*Director of the United States Patent and Trademark Office*